US012347095B1

(12) United States Patent
Bell et al.

(10) Patent No.: US 12,347,095 B1
(45) Date of Patent: Jul. 1, 2025

(54) SENSOR DATA PROCESSING FOR MONITORING DEVICE PERFORMANCE

(71) Applicant: Wells Fargo Bank, N.A., San Francisco, CA (US)

(72) Inventors: Thomas E. Bell, San Francisco, CA (US); Peter Bordow, Fountain Hills, AZ (US); Julio Jiron, San Bruno, CA (US); Akhlaq M. Khan, San Francisco, CA (US); Volkmar Scharf-Katz, San Francisco, CA (US); Jeff J. Stapleton, Arlington, TX (US); Richard Orlando Toohey, San Francisco, CA (US); Ramesh Yarlagadda, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 323 days.

(21) Appl. No.: 17/896,407

(22) Filed: Aug. 26, 2022

(51) Int. Cl.
*G06T 7/00* (2017.01)
*G06K 7/14* (2006.01)
(Continued)

(52) U.S. Cl.
CPC ............ *G06T 7/001* (2013.01); *G06K 7/1417* (2013.01); *G06V 10/95* (2022.01); *G10L 25/03* (2013.01);
(Continued)

(58) Field of Classification Search
CPC ........... G06T 7/001; G06T 2207/10016; G06T 2207/30164; G06K 7/1417; G06V 10/95; G06V 2201/06; G10L 25/03
See application file for complete search history.

(56) References Cited

U.S. PATENT DOCUMENTS 7,133,846 B1    11/2006 Ginter et al.
7,673,797 B2    3/2010 Edwards
(Continued)

FOREIGN PATENT DOCUMENTS

CA    2478548 C    3/2014
DE    102021108925 A1 *    10/2022    ........... G06V 10/141
(Continued)

OTHER PUBLICATIONS

Jain, et al., A Blockchain-Based distributed network for Secure Credit Scoring, 2019 5th International Conference on Signal Processing, Computing and Control (ISPCC), 306-12, Oct. 2019; ISBN-13: 978-1-7281-3988-3.
(Continued)

*Primary Examiner* — Kathleen M Broughton
(74) *Attorney, Agent, or Firm* — Foley & Lardner LLP

(57) ABSTRACT

Disclosed are example methods, systems, and devices for sensor data processing for monitoring devices. These techniques include receiving scan data from a computing device that corresponds to a scan by an imaging device and analyzing the scan data to determine that the scan data corresponds to a manufactured article. An indication can be transmitted with a request for audiovisual data corresponding to an operation of the manufactured article, and the audiovisual data can be received from an imaging device or a microphone of the computing device. A sound sample corresponding to the operation of the manufactured article is extracted, and a status metric for the article is generated based on a comparison of the sound sample to a sound signature in an identity profile of the manufactured article. The status of the manufactured article can then be determined.

20 Claims, 3 Drawing Sheets

(51) Int. Cl.
*G06V 10/94* (2022.01)
*G10L 25/03* (2013.01)
(52) U.S. Cl.
CPC ............. *G06T 2207/10016* (2013.01); *G06T 2207/30164* (2013.01); *G06V 2201/06* (2022.01)

(56) References Cited

U.S. PATENT DOCUMENTS

| | | | |
|---|---|---|---|
| 8,234,387 | B2 | 7/2012 | Bradley et al. |
| 8,446,275 | B2 | 5/2013 | Utter, II |
| 8,731,977 | B1 | 5/2014 | Hardin et al. |
| 8,756,153 | B1 | 6/2014 | Rolf |
| 8,831,972 | B2 | 9/2014 | Angell et al. |
| 8,965,803 | B2 | 2/2015 | Jung et al. |
| 9,087,058 | B2 | 7/2015 | Neven et al. |
| 9,094,388 | B2 | 7/2015 | Tkachev |
| 9,177,257 | B2 | 11/2015 | Kozloski et al. |
| 9,443,298 | B2 | 9/2016 | Ross et al. |
| 9,519,783 | B2 | 12/2016 | Pruthi et al. |
| 9,558,397 | B2 | 1/2017 | Liu et al. |
| 9,734,290 | B2 | 8/2017 | Srinivas et al. |
| 9,864,992 | B1 | 1/2018 | Robinson et al. |
| 10,024,684 | B2 | 7/2018 | Wang |
| 10,044,700 | B2 | 8/2018 | Gresham et al. |
| 10,075,445 | B2 | 9/2018 | Chen et al. |
| 10,102,491 | B2 | 10/2018 | Connolly et al. |
| 10,110,608 | B2 | 10/2018 | Dureau |
| 10,127,378 | B2 | 11/2018 | Toth |
| 10,142,362 | B2 | 11/2018 | Weith et al. |
| 10,181,032 | B1 | 1/2019 | Sadaghiani et al. |
| 10,210,527 | B2 | 2/2019 | Radocchia |
| 10,218,510 | B2 | 2/2019 | Kinney et al. |
| 10,313,336 | B2 | 6/2019 | Giobbi |
| 10,362,027 | B2 | 7/2019 | Eramian et al. |
| 10,387,695 | B2 | 8/2019 | Engels et al. |
| 10,454,913 | B2 | 10/2019 | Maninder et al. |
| 10,505,965 | B2 | 12/2019 | Moyle et al. |
| 10,552,596 | B2 | 2/2020 | Wang et al. |
| 10,572,778 | B1 | 2/2020 | Robinson et al. |
| 10,614,302 | B2 | 4/2020 | Withrow |
| 10,664,581 | B2 | 5/2020 | Hou et al. |
| 10,740,767 | B2 | 8/2020 | Withrow |
| 10,757,097 | B2 | 8/2020 | Yocam et al. |
| 10,778,676 | B1 | 9/2020 | Griffin et al. |
| 10,834,084 | B2 | 11/2020 | Ouellette et al. |
| 10,855,679 | B2 | 12/2020 | Rajakumar |
| 10,938,828 | B1 | 3/2021 | Badawy et al. |
| 10,943,003 | B2 | 3/2021 | Bingham et al. |
| 10,963,670 | B2 | 3/2021 | Ross et al. |
| 10,977,353 | B2 | 4/2021 | Bender et al. |
| 11,044,267 | B2 | 6/2021 | Jakobsson et al. |
| 11,048,794 | B1 | 6/2021 | Bordow |
| 11,048,894 | B2 | 6/2021 | Feldman |
| 11,055,390 | B1 | 7/2021 | Kragh |
| 11,057,366 | B2 | 7/2021 | Avetisov et al. |
| 11,068,909 | B1 | 7/2021 | Land et al. |
| 11,075,904 | B2 | 7/2021 | Jha et al. |
| 11,089,014 | B2 | 8/2021 | Buscemi |
| 11,093,789 | B2 | 8/2021 | Wang et al. |
| 11,100,503 | B2 | 8/2021 | Iyer et al. |
| 11,127,092 | B2 | 9/2021 | Kurian |
| 11,128,467 | B2 | 9/2021 | Chapman et al. |
| 11,151,550 | B2 | 10/2021 | Prabhu et al. |
| 11,157,907 | B1 | 10/2021 | Kumar |
| 11,163,931 | B2 | 11/2021 | Ricci |
| 11,200,306 | B1 | 12/2021 | Singh |
| 11,205,011 | B2 | 12/2021 | Jakobsson et al. |
| 11,223,646 | B2 | 1/2022 | Cunningham et al. |
| 11,290,448 | B1 | 3/2022 | Bordow |
| 11,327,992 | B1 | 5/2022 | Batsakis et al. |
| 11,451,532 | B2 | 9/2022 | Arif Khan et al. |
| 11,461,298 | B1 | 10/2022 | Shemmer et al. |
| 11,509,477 | B1 | 11/2022 | Poder et al. |
| 11,514,155 | B1 | 11/2022 | Bordow |
| 11,522,867 | B2 | 12/2022 | Han et al. |
| 11,669,611 | B1 | 6/2023 | Bordow |
| 12,034,719 | B2 | 7/2024 | Budman et al. |
| 2003/0086341 | A1* | 5/2003 | Wells .................. G06F 16/683 704/E15.045 |
| 2006/0129478 | A1 | 6/2006 | Rees |
| 2007/0078908 | A1 | 4/2007 | Rohatgi et al. |
| 2008/0022370 | A1 | 1/2008 | Beedubail et al. |
| 2008/0120302 | A1 | 5/2008 | Thompson |
| 2009/0089107 | A1 | 4/2009 | Angell et al. |
| 2009/0089205 | A1 | 4/2009 | Bayne |
| 2012/0237908 | A1 | 9/2012 | Fitzgerald et al. |
| 2014/0200885 | A1* | 7/2014 | Diggins ................ H04H 60/58 704/206 |
| 2015/0112732 | A1 | 4/2015 | Trakru et al. |
| 2015/0220999 | A1 | 8/2015 | Thornton et al. |
| 2015/0317728 | A1 | 11/2015 | Nguyen |
| 2016/0050557 | A1 | 2/2016 | Park et al. |
| 2016/0162882 | A1 | 6/2016 | McClung, III |
| 2016/0224773 | A1 | 8/2016 | Ramaci |
| 2016/0335629 | A1 | 11/2016 | Scott |
| 2017/0012992 | A1 | 1/2017 | Doctor et al. |
| 2017/0063831 | A1 | 3/2017 | Arnold et al. |
| 2017/0063946 | A1 | 3/2017 | Quan et al. |
| 2017/0111351 | A1 | 4/2017 | Grajek et al. |
| 2017/0230351 | A1 | 8/2017 | Hallenborg |
| 2017/0236037 | A1* | 8/2017 | Rhoads ............... G06F 16/5866 382/103 |
| 2018/0068103 | A1* | 3/2018 | Pitkänen .......... G06Q 20/40145 |
| 2018/0205546 | A1 | 7/2018 | Haque et al. |
| 2019/0095916 | A1 | 3/2019 | Jackson |
| 2019/0098500 | A1 | 3/2019 | Chen et al. |
| 2019/0149539 | A1 | 5/2019 | Scruby |
| 2019/0163889 | A1 | 5/2019 | Bouse |
| 2019/0205939 | A1 | 7/2019 | Lal et al. |
| 2019/0296913 | A1 | 9/2019 | Verma et al. |
| 2019/0334724 | A1 | 10/2019 | Anton et al. |
| 2019/0342276 | A1 | 11/2019 | Sherif et al. |
| 2020/0036709 | A1 | 1/2020 | Mars et al. |
| 2020/0211031 | A1 | 7/2020 | Patil |
| 2020/0236113 | A1 | 7/2020 | Monica et al. |
| 2020/0266985 | A1 | 8/2020 | Covaci et al. |
| 2020/0311678 | A1 | 10/2020 | Fletcher et al. |
| 2020/0320619 | A1 | 10/2020 | Motaharian et al. |
| 2020/0374311 | A1 | 11/2020 | Madhu et al. |
| 2020/0380598 | A1 | 12/2020 | Spector et al. |
| 2021/0027061 | A1 | 1/2021 | Xu et al. |
| 2021/0029100 | A1 | 1/2021 | Bendersky et al. |
| 2021/0089637 | A1 | 3/2021 | Cummins et al. |
| 2021/0104008 | A1 | 4/2021 | Ross et al. |
| 2021/0110004 | A1 | 4/2021 | Ross et al. |
| 2021/0134434 | A1 | 5/2021 | Riley et al. |
| 2021/0202067 | A1 | 7/2021 | Williams et al. |
| 2021/0231706 | A1 | 7/2021 | Pak |
| 2021/0234673 | A1 | 7/2021 | Kurian et al. |
| 2021/0234693 | A1 | 7/2021 | Kurian et al. |
| 2021/0240837 | A1 | 8/2021 | Tseng et al. |
| 2021/0258155 | A1 | 8/2021 | Andon et al. |
| 2021/0279475 | A1 | 9/2021 | Tusch et al. |
| 2021/0297259 | A1 | 9/2021 | Rahn et al. |
| 2021/0325427 | A1* | 10/2021 | Jain ..................... G01P 15/18 |
| 2021/0326467 | A1 | 10/2021 | Levy et al. |
| 2021/0366014 | A1* | 11/2021 | Wang ..................... G06F 21/36 |
| 2021/0366586 | A1 | 11/2021 | Ryan et al. |
| 2021/0399895 | A1 | 12/2021 | Abadir et al. |
| 2022/0004616 | A1 | 1/2022 | Eisen et al. |
| 2022/0086141 | A1 | 3/2022 | Mossler et al. |
| 2022/0292396 | A1 | 9/2022 | Biryukov et al. |
| 2022/0345451 | A1 | 10/2022 | Hitchcock et al. |
| 2023/0097761 | A1 | 3/2023 | Martin De La Bastide et al. |
| 2023/0334476 | A1 | 10/2023 | Rule et al. |
| 2023/0403144 | A1 | 12/2023 | Rhodin |
| 2024/0039537 | A1 | 2/2024 | Kumar et al. |
| 2024/0064135 | A1 | 2/2024 | Sherlock et al. |
| 2024/0185596 | A1* | 6/2024 | Neuschaefer ............ G06V 30/28 |
| 2024/0185660 | A1 | 6/2024 | Masood |
| 2024/0214194 | A1 | 6/2024 | Kapur et al. |

(56) References Cited

U.S. PATENT DOCUMENTS

2024/0256878 A1    8/2024   Palleti et al.
2024/0340314 A1   10/2024   Radon et al.
2024/0346085 A1   10/2024   Soon-Shiong

FOREIGN PATENT DOCUMENTS

| WO | WO-2011/016710 A1 | 2/2011 |
| WO | WO-2016/083987 A1 | 6/2016 |
| WO | WO-2019/013818 A1 | 1/2019 |
| WO | WO-2019/123291 A1 | 6/2019 |

OTHER PUBLICATIONS

Yan Zhang et al., Real-time Machine Learning Prediction of an Agent-Based Model for Urban Decision-making, URL: https://ifaamas.org/Proceedings/aamas2018/pdfs/p2171.pdf (Jul. 10-15, 2018).

\* cited by examiner

SENSOR DATA PROCESSING FOR MONITORING DEVICE PERFORMANCE

TECHNICAL FIELD

The present disclosure relates to sensor data processing for monitoring and/or evaluating device status, performance, and/or identity at multiple points in time.

BACKGROUND

Monitoring the operational performance of equipment is important to maintain operational efficiency and sustain long-term equipment operation. Self-diagnostic readings of said equipment often fail to provide a complete picture of device operational performance over time.

SUMMARY

One aspect of the present disclosure relates to a method for maintaining identity elements for manufactured articles. The method may be performed, for example, by one or more processors coupled to memory. The method may include receiving, from a computing device, a first data packet including scan data corresponding to a scan by an imaging device of the computing device. The method may include analyzing the scan data in the first data packet to determine that the scan data corresponds to a manufactured article. The method may include transmitting to the computing device a first indication that the manufactured article has been identified and a request for audiovisual data corresponding to an operation of the manufactured article. The method may include receiving, from the computing device, a second data packet including audiovisual data corresponding to a recording by at least one of the imaging device or a microphone of the computing device. The method may include extracting, from the second data packet, a sound sample corresponding to sounds made during the operation of the manufactured article. The method may include generating a status metric based on a comparison of the sound sample to a sound signature in an identity profile of the manufactured article. The method may include transmitting, to the computing device, a status of the manufactured article based on the status metric.

In some implementations, the status may indicate that the manufactured article is in a first state if the status metric exceeds a threshold, or a second state otherwise. In some implementations, the first state may indicate that the manufactured article is substantially unchanged since a time of generation of the sound signature. In some implementations, the second state may indicate that the manufactured article could not be confirmed to be substantially unchanged since the time of generation of the sound signature. In some implementations, the status may indicate that an identity of the manufactured article has been verified.

In some implementations, the scan may correspond to a code corresponding to the manufactured article. In some implementations, the code may be a QR code affixed to the manufactured article. In some implementations, the imaging device may be a camera of the computing device. In some implementations, the scan may correspond to an image of the manufactured article captured using the camera. In some implementations, the recording may be a video of the manufactured article. In some implementations, the method can include adding the sound sample to the identity profile of the manufactured article.

In some implementations, the method can include generating a second sound signature for the manufactured article. In some implementations, the method can include adding the second sound signature to the identity profile of the manufactured article. In some implementations, the method can include generating the sound signature based on an earlier sound sample of sounds made by the manufactured article during operation. In some implementations, the method can include receiving, from the computing device, location data detected using a GPS device of the computing device. In some implementations, the method can include adding the location data to the identity profile of the manufactured article.

In some implementations, the operation may include a startup of the manufactured article. In some implementations, the operation may correspond to the manufactured article performing a task. In some implementations, the sound signature may be based on sounds made by the manufactured article previously performing the task. In some implementations, the identity profile may include a set of identity elements corresponding to the manufactured article. In some implementations, the set of identity elements may include data on a design of the manufactured article. In some implementations, the set of identity elements may include data on manufacturing of the manufactured article.

Another aspect of the present disclosure relates to a system configured for maintaining identity elements for manufactured articles. The system may include one or more processors coupled to a non-transitory memory. The system can receive, from a computing device, a first data packet including scan data corresponding to a scan by an imaging device of the computing device. The system can analyze the scan data in the first data packet to determine that the scan data corresponds to a manufactured article. The system can transmit to the computing device a first indication that the manufactured article has been identified and a request for audiovisual data corresponding to an operation of the manufactured article. The system can receive, from the computing device, a second data packet including audiovisual data corresponding to a recording by at least one of the imaging device or a microphone of the computing device. The system can extract, from the second data packet, a sound sample corresponding to sounds made during the operation of the manufactured article. The system can generate a status metric based on a comparison of the sound sample to a sound signature in an identity profile of the manufactured article. The system can transmit, to the computing device, a status of the manufactured article based on the status metric.

In some implementations of the system, the status may indicate that the manufactured article is in a first state if the status metric exceeds a threshold, or a second state otherwise. In some implementations of the system, the first state may indicate that the manufactured article is substantially unchanged since a time of generation of the sound signature. In some implementations of the system, the second state may indicate that the manufactured article could not be confirmed to be substantially unchanged since the time of generation of the sound signature.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are detailed descriptions of various concepts related to, and implementations of, techniques, approaches, methods, apparatuses, and systems for sensor data processing for monitoring device status. The various concepts introduced above and discussed in detail below may be implemented in any of numerous ways, as the described concepts are not limited to any particular manner of implementation. Examples of specific implementations and applications are provided primarily for illustrative purposes.

Various embodiments described herein relate to systems and methods for sensor data processing for monitoring device status. Monitoring the operational performance of equipment is important to maintain operational efficiency and to sustain long-term lifetime of equipment operation. Self-diagnostic readings of said equipment often fail to provide a complete picture of device operational performance over time. It is therefore challenging both to ensure that a device is operating optimally over time and also to identify whether any aspects of the device have been modified to circumvent self-reporting security features. For example, vehicle maintenance record, driving pattern, tire wear, fuel consumption (e.g., source, type, quantity), rather than just license plate number (which can be swapped) or vehicle identification number (VIN) (which can be scratched off), can provide a rich dataset that may be compared to sensor data (e.g., images, video, sound signatures, etc.) captured in real-time to determine a confidence in the identity of the vehicle.

In an embodiment, the history of a manufactured article or its components (e.g., from design, to manufacturing of components, to assembly, to delivery) can be used to form an article profile (e.g., an identity profile) for the manufactured article, to ensure optimal device performance, prevent equipment fraud, and help authenticate devices, such that, by time of delivery, it can be determined if a device was changed, substituted, or modified. Any type of manufactured article can be monitored using the present techniques, including internet-of-things (IoT) devices, vehicles, or any type of equipment, which can, but need not, be "smart" networked devices. For example, various objects (e.g., art, vehicles, devices, etc.) may be monitored or scanned for dimensions and other features (color, texture, imperfections, etc.). These features can be extracted, analyzed, and used to generate a profile for the article. These and other techniques are described in detail herein. Manufactured articles may thus be, or may include, manufactured devices or other hardware, which may include software or firmware components.

Figure 1:
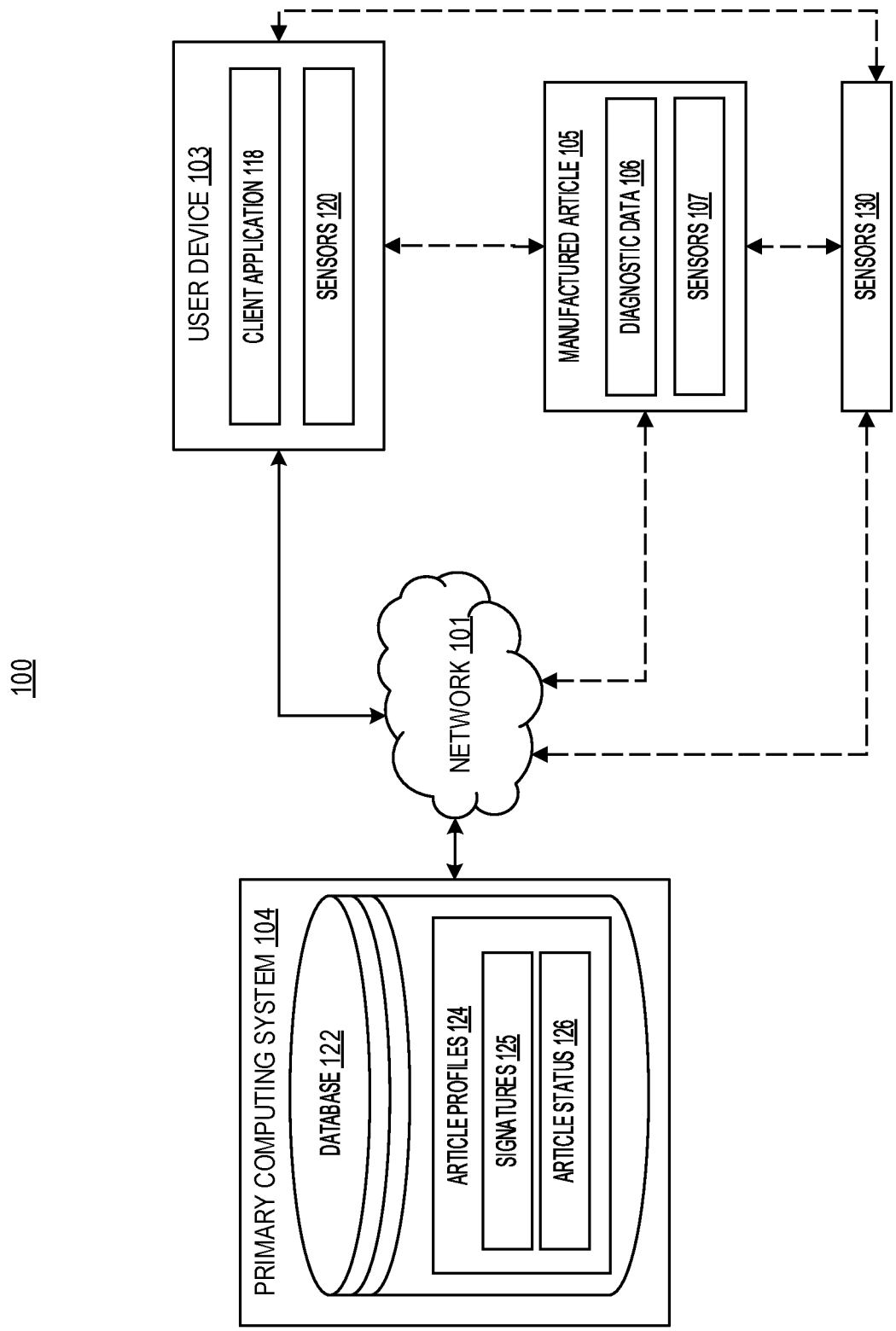
FIG. 1 is a block diagram of an example system for sensor data processing for monitoring device status, in accordance with one or more example implementations.

Referring to FIG. 1, illustrated is a block diagram of an example system 100 for sensor data processing for monitoring device status, in accordance with one or more example implementations. The system 100 may include a primary computing system 104 (e.g., one or more servers, a computing system, etc.), a user device 103, and a manufactured article 105. Each of the primary computing system 104, and the user device(s) 103 can be in communication with one another via the network 101. The network 101 can facilitate communications among the primary computing system 104 and the user device 103 over, for example, the internet or another network via any of a variety of network protocols such as Ethernet, Bluetooth, Cellular, or Wi-Fi. In an embodiment, the manufactured article 105 may also communicate via the network 101 with the primary computing system 104 or the user device 103. Additionally or alternatively, the manufactured article 105 may communicate with the user device 103 via a close-proximity communication interface, such as a wired connection or a short-range wireless connection (e.g., Wi-Fi, Bluetooth, near-field communication (NFC), etc.).

Each component of the system 100 may include one or more processors, memories, network interfaces, and user interfaces. The memory may store programming logic that, when executed by the processor, controls the operation of the corresponding computing device. The memory may also store data in databases. The network interfaces allow the computing devices to communicate wirelessly or otherwise. The various components of devices in system 100 may be implemented via hardware (e.g., circuitry), software (e.g., executable code), or any combination thereof.

The user device 103 can include at least one processor and a memory (e.g., a processing circuit). The memory can store processor-executable instructions that, when executed by a processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The user device 103 can include one or more computing devices or servers that can perform various functions as described herein. The user device 103 can include any or all of the components and perform any or all of the functions of the computer system 300 described herein in conjunction with FIG. 3.

The user device 103 may include mobile or non-mobile devices, such as smartphones, tablet computing devices, wearable computing devices (e.g., a smartwatch, smart optical wear, etc.), personal computing devices (e.g., laptops or desktops), voice-activated digital assistance devices (e.g., smart speakers having chat bot capabilities), portable media devices, vehicle information systems, or the like. The user device 103 may access one or more software applications running locally or remotely. The user device 103 may operate as a "thin client" device, which presents user interfaces for applications that execute remotely (e.g., at the primary computing system 104, etc.). The user device 103 can be associated with a respective device identifier. The identifier may be a universally unique identifier (UUID), a globally unique identifier (GUID), a media access control (MAC) address, an internet protocol (IP) address, a device serial number, a serial number of a component of the user device 103, a predetermined or randomly generated value associated with the user device 103, or any type of identifier that identifies the user device 103 or the components thereof.

Input from the user received via the user device 103 may be communicated to the server (e.g., the primary computing system 104) executing a remote application, which may provide additional information to the user device 103 or execute further operations in response to the user input. Additionally, input at the user device 103 may be transmitted to the primary computing system 104 in the form of one or more requests, messages, or data packets, as described herein. The user device 103 may include short-range communication circuitry that enables the user device 103 to communicate with the manufactured article 105. For example, the user device 103 can include a close-proximity communication interface, such as a wired connection or a short-range wireless connection (e.g., Wi-Fi, Bluetooth, NFC, etc.).

The user device 103 can execute a client application 118, which may provide one or more user interfaces and receive user input via one or more input/output (I/O) devices. The client application 118 may be provided by or be associated with the primary computing system 104 or, in an embodiment, the manufactured article 105. The client application 118 may be a web-based application that is retrieved and displayed in a web-browser executing at the primary computing system 104 or the manufactured article 105. For example, the primary computing system 104 or the manufactured article 105 can execute a web server or other types of web-enabled application elements that provide one or more web pages or display instructions to the client application 118 executing at the user device 103. Additionally or alternatively, the client application 118 can execute locally at the user device 103 and may communicate information with the primary computing system 104 via the network 101. The client application 118 may communicate with the manufactured article 105 via the network 101 or via a secondary communications channel (e.g., Bluetooth, Wi-Fi, NFC, etc.). Alternatively, in another embodiment, the manufactured article 105 may not include communications circuitry, and therefore may not communicate with the user device 103 or the primary computing system 104. The client application 118 can access one or more device identifiers of the user device 103 using an application programming interface (API) of an operating system of the user device 103. In some implementations, the client application 118 can access a predetermined region of memory where the user device 103 stores one or more device identifiers.

The client application 118 may present various user interfaces, for example, in response to user input or interactions with displayed interactive user interface elements. The user interfaces can be utilized to present information to the user or to receive information or input from the user. In an embodiment, the user interfaces can prompt the user to capture sensor data in proximity to the manufactured article 105 (e.g., sound data, video data, vibrational data, etc.). The user interface may include interactive elements that, when interacted with, cause the user device 103 to transmit one or more requests, data packets, or other data related to the techniques described herein. Additionally, the client application 118 may receive display instructions to display various content (e.g., text, graphics, video, instructions to monitor a manufactured article 105, etc.) from the primary computing system 104. The user interfaces can include any type of interactive user interface element, including those that enable a user to provide information that can be stored in the article status 126, send requests, or to navigate between user interfaces of the client application 118.

The user device 103 can include one or more sensors 120. The sensors 120 can include one or more image or video sensors (e.g., image or video capture devices, etc.) or ambient sensors (e.g., microphones, vibrational sensors, etc.), electrical power sensors (e.g., voltage sensors, current sensors, etc.), or any other type of sensor capable of capturing information relating to a manufactured article 105. The sensors 120 can include components that capture ambient sights and sounds (such as cameras and microphones). The sensors 120 may also include components that couple to the manufactured article, either electrically (e.g., power sensors) or physically (e.g., sound or vibration sensors) while the manufactured article 105 is operating. In an embodiment, the sensors 120 may include one or more location sensors to enable the user device 103 to determine its geographic location, or the geographic location of a manufactured article 105. Example location sensors include global positioning system (GPS) devices and other navigation and geolocation devices, digital compasses, gyroscopes and other orientation sensors, as well as proximity sensors or other sensors that allow the user device 103 to detect the presence and relative distance of nearby objects and devices. Similarly, the manufactured article 105 may include one or more sensors 107 that may be the same as or different from sensors 120. The sensors of system 100 may thus be embedded, bundled, external, or internal to the manufactured device 105 and/or embedded, bundled, external or internal to the user device 103. Additionally, system 100 may include sensors 130 that are separate from both the manufactured article 105 and the user device 103. System 100 may include sensors 107, sensors 120, and/or sensors 130, each of which may include one or more sensors, and may include the same sensors, different sensors, and/or some of the same sensors (e.g., for redundancy) and some different sensors. Example sensor data includes temperature data from thermometers, power readings from power meters, memory usage (e.g., disk usage or disk space) data from controllers, network packet traffic data from network devices, etc.

The primary computing system 104 can include at least one processor and a memory (e.g., a processing circuit). The memory can store processor-executable instructions that, when executed by processor, cause the processor to perform one or more of the operations described herein. The processor may include a microprocessor, an ASIC, an FPGA, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. The primary computing system 104 can include one or more computing devices or servers that can perform various functions as described herein. The primary computing system 104 can include any or all of the components and perform any or all of the functions of the computer system 300 described herein in conjunction with FIG. 3.

The primary computing system 104 can be a computing system of an entity that maintains article profiles (e.g., the article profiles 124) for a number of different manufactured articles 105. The primary computing system 104 can provide and receive information from the client application 118 executing on the user devices 103, for example, to receive sensor data or other information relating to a manufactured article 105 to determine, monitor, or verify a manufactured article 105. The user can utilize the client application 118 to communicate with the primary computing system 104, for example, to determine, monitor, or verify a manufactured article 105. Such functionality can include authenticating and updating the article status 126 of a manufactured article 105 using the sound signatures 125 stored in the article profile 124 of the manufactured article 105.

The primary computing system 104 can maintain, manage, or store article profiles 124, for example, in one or more data structures in the memory of or a database 122 managed by the primary computing system 104. Each of the article profiles 124 may correspond to a respective manufactured article 105, and may be identified by a corresponding article identifier (e.g., a serial number, a UUID, a GUID, a password, a model number, etc.). The article profiles 124 can include any information about the manufactured article 105, including identifying data (e.g., type, make model, etc.), historical data (e.g., manufacture date, location, etc.), communication data (e.g., passwords, passcodes, security keys, etc., with which to communicate with the manufactured article 105), or other article data that is maintained or otherwise accessible to the primary computing system 104. The primary computing system 104 can receive data for the article profiles 124 or subsets thereof via the client application 118, for example, by way of user input, or from other computing devices (not pictured) via the network 101.

Each article profile 124 can be stored in association with one or more signatures 125. The signatures 125 can include any type of feature set that may be utilized to verify the authenticity of the manufactured article 105. In an embodiment, the signatures 125 can include a sound signature, which includes features extracted from sound recorded in proximity to the manufactured article 105 during operation of the manufactured article 105. Other types of signatures are also possible, including image signatures (e.g., images or features extracted from images of the manufactured article 105, etc.), dimensional or physical signatures (e.g., a size, shape, or other physical characteristics of the manufactured article 105, etc.), or other information relating to the manufactured article 105, which may be received from the manufactured article 105 or from a third-party computing system associated with the manufactured article 105. The signatures 125 can be generated by the one or more sensors 120. For example, the data in the signatures 125 may include readings from power sensors, vibrational sensors, image sensors, or other types of sensors 120 captured while the corresponding manufactured article 105 was operating. Some non-limiting examples of data included in the signatures of 120 include sound signatures, power usage patterns (e.g., while the manufactured article is in different states), video or appearance patterns (e.g., the visual appearance of the manufactured article 105 as it operates), vibrational patterns of the manufactured article 105, among other signatures. In certain embodiments, data additionally or alternatively may be, or may include, status of light emitting diode (LED) lights or displays (e.g., which lights are one or off, color of LED lights, or patterns of lights turning on/off or changing color), which may indicate various statuses (e.g., normal state, error state, etc.).

Each article profile 124 can be stored in association with an article status 126. The article status 126 can include information relating to a current operational status of the manufactured article 105 to which the article profile 124 corresponds. Article status 126 information can include, for example, location information, operational information (e.g., uptime, scheduled uptime, whether the manufactured article 105 is currently operating or scheduled to be operating, etc.), maintenance information (e.g., whether the manufactured article 105 has undergone maintenance, records of maintenance procedures, etc.), and records of components of the manufactured article 105 (e.g., part serial numbers, whether one or more parts have been replaced, etc.). Article status may correspond to such states as power on, power off, undergoing diagnostics (e.g., startup diagnostics or reset diagnostics), steady state operation, and/or reset to manufacturer initial state. The primary computing system 104 can update the article status 126, for example, in response to a corresponding request from a user device 103.

Additionally, the article profiles 124 can store a record of ownership for the corresponding manufactured article 105. For example, the article profiles 124 can include a record of ownership, including any transfers of ownership, for various entities that own or previously owned the manufactured article 105. In addition to the current article status 126, a corresponding article status 126 can be stored for each time the manufactured article 105 has transferred ownership (e.g., to show a status of the manufactured article 105 when ownership was transferred). The article status 126 can store various information about the verification or authentication procedures that have been performed to verify the manufactured article 105. For example, the article status 126 can indicate that the manufactured article is in various states (e.g., operational, currently down or undergoing maintenance, in need of maintenance, shows evidence of fraud or tampering, etc.). The article status 126 can be updated by the primary computing system 104 using the techniques described in connection with FIG. 2. In another example, the article status 126 can indicate that the manufactured article 105 has been substantially unchanged for a period of time (e.g., since the last verification of the manufactured article 105). Alternatively, if tampering has been detected, the article status 126 can indicate that the manufactured article 105 may show evidence of tampering since the last verification process. The article status 126, including any results of one or more verification processes, may be provided to the user device 103 and displayed in one or more user interfaces of the client application 118.

In an example, a user device 103 of a maintenance person may transmit an indication of whether/when maintenance was performed, a record of what type of maintenance was performed, as well as serial numbers of components of the manufactured article 105 that have been replaced or modified. In response to the indication or request, the primary computing system 104 can update the article status 126. Additionally, the article status 126 may include diagnostic data 106 transmitted by the manufactured article 105 to the primary computing system 104, or to the user device 103 (and then to the primary computing system 104 via the user device 103). In an embodiment in which the manufactured article 105 can communicate with the primary computing system 104 via the network 101, the primary computing system 104 may periodically (or according to a schedule) request diagnostic data 106 from the manufactured article 105, and store the diagnostic data 106 as part of the article status 126. Manufactured article 105 may also include one or more internal, external, bundled, or discreet sensors 107.

The manufactured article 105 can be any type of device, object, or equipment that is manufactured by an entity. The manufactured article 105 can be, for example, a vehicle, an automated teller machine (ATM), a smart phone, devices that include or do not include processors or memory, or any type of object. In an embodiment, the manufactured article 105 is a device that can communicate via the network 101. The manufactured article 105 may operate, and may be monitored by the sensors 120 of the user device 103 while operating. In an embodiment, the manufactured article can include the sensors 120, the readings of which can be provided to or retrieved using the user device 103.

In an embodiment, the manufactured article 105 can include at least one processor and a memory (e.g., a processing circuit). The memory can store processor-executable instructions that, when executed by processor, cause the processor to perform one or more of the operations described herein. The processor may include a microprocessor, a microcontroller, an ASIC, an FPGA, etc., or combinations thereof. The memory may include, but is not limited to, electronic, optical, magnetic, or any other storage or transmission device capable of providing the processor with program instructions.

The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. In such embodiments, the manufactured article 105 can include one or more computing devices that can perform various functions as described herein. In such embodiments, manufactured article 105 can include any or all of the components and perform any or all of the functions of the computer system 300 described herein in conjunction with FIG. 3. The memory of the manufactured article 105 can store diagnostic information 106. In an embodiment, the manufactured article 105 can generate diagnostic information 106, which can include any type of information relating to the performance or condition of the manufactured article 105. For example, the diagnostic information 106 can include log files, operational data, and configuration settings for the operation of the manufactured article 105, among any other data that may be utilized or generated by the manufactured article 105. The manufactured article 105 may provide the diagnostic information 106 either to the primary computing system 104 (e.g., via the network 101 in response to a request) or to the user device 103 (e.g., via a communication channel in response to a request).

Figure 2:
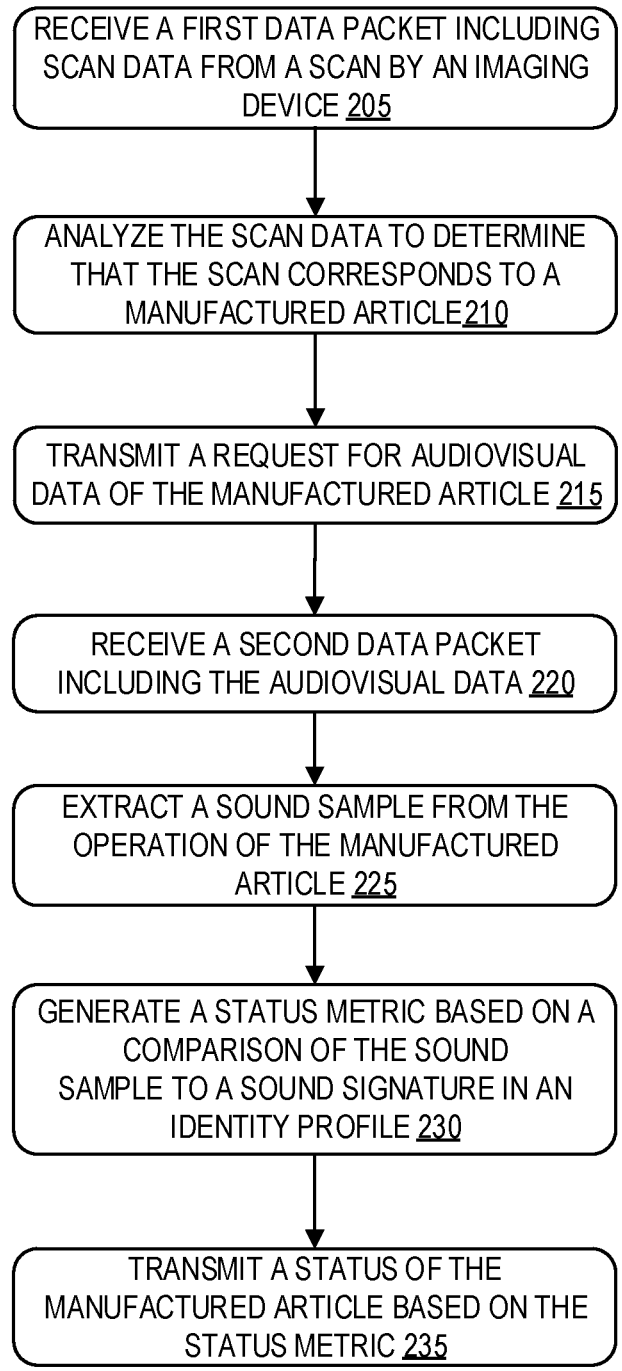
FIG. 2 is a flow diagram of an example method for sensor data processing for monitoring device status, in accordance with one or more example implementations.

Referring to FIG. 2, illustrated is a flow diagram of an example method 200 for sensor data processing for monitoring device status, in accordance with one or more example implementations. The method 200 can be a computer-implemented method. The method 200 may be implemented, for example, using any of the computing systems described herein, such as the primary computing system 104, the user device 103, a computing device of the manufactured article 105, or the computing system 300 described in connection with FIG. 3. In some implementations, additional, fewer, or different operations may be performed. It will be appreciated that the order or flow of operations indicated by the flow diagrams and arrows with respect to the methods described herein is not meant to be limiting. For example, in one implementation, two or more of the operations of method 200 may be performed simultaneously, or one or more operations may be performed as an alternative to another operation. Although the following is described as being performed by the primary computing system (e.g., the primary computing system 104), it should be understood that any one or more of the computing devices described herein may implement the method 200.

At step 205, the method 200 includes receiving, from a computing device (e.g., the user device 103), a first data packet comprising scan data corresponding to a scan by an imaging device (e.g., an image capture device, a video capture device, etc.) of the computing device. The first data packet can be any type of data structure that includes information relating to the scan. The first data packet can be a data packet that is transmitted via a network (e.g., the network 101). The scan can be performed, for example, using a camera or another type of scanning device of the computing device, such as a barcode reader or a quick-response (QR) code reader. In some implementations, the image or video capture devices of the computing device that can capture video or images can include devices that capture non-visible light, such as infrared (IR) or ultraviolet (UV) light, which may scan non-visible light features of manufactured article (e.g., the manufactured article 105). In certain embodiments, the scan can be of the entire manufactured article, or a section, view, component, or other characteristic thereof. For example, the scan may include a portion of the article that may be expected to have sufficient uniqueness (at least as the article is used, transported, stored, or otherwise ages, wears, or morphs due to internal or ambient conditions or factors) or distinguishing aspects that can be detected using a sensor (e.g., an imaging device) be able to uniquely identify an article, serving as a sort of "fingerprint" or other distinguishing physical metric or characteristic of the article. User interfaces on an application (e.g., the client application 118) executing on the computing device can prompt the user to scan the manufactured article using the sensors (e.g., the sensors 107, the sensors 120, and/or the sensors 130) of the computing device to perform the techniques described herein. As used herein, a "metric" may be, may include, or may be based on one or more measurements of one or more attributes. A metric may be, or may be based on, a combination of multiple measurements, readings, or data points of the same type (e.g., from one type of sensor), or of different types (e.g., from multiple types of sensors). A metric may also be a value or set of values that are based on an analysis or transformation of one or more measurements, readings, or data points. It is noted that a status or state may be based on one or more metrics or analyses and/or transformations thereof. Metrics (e.g., each attribute-based metric) may have an associated assurance level, such as low, medium, or high assurance level. For example, certain physical attributes (e.g., dimensions and/or weight) might have a "high" assurance level, whereas certain other attributes (e.g., LED patterns) might have a "low" assurance level.

The scan can be performed to capture or verify a code (or other unique or otherwise distinguishing characteristic(s)) corresponding to the manufactured article. The code may be physically imprinted, plated, etched, glued, or otherwise secured to the manufactured article in some manner, or may be present in proximity to the manufactured article or may otherwise be associated with the manufactured article. The code can be any type of code, including a numerical serial number or identifier number, a QR code associated with the manufactured article, a barcode associated with the manufactured article, a media access control (MAC) address, device identifier, or any other type of identification. The scan can be an image of the manufactured article captured using the camera of the computing device. Additionally or alternatively, the scan can be a recording (or one or more frames of a recording) from a video of the manufactured article. The computing device can store the scan data as part of the first data packet and transmit the first data packet to the primary computing system (e.g., the primary computing system 104, described in this example as performing the method 200).

At step 210, the method 200 includes analyzing the scan data in the first data packet to determine that the scan data corresponds to a manufactured article. Upon receiving the first packet, the primary computing system can extract the scan data from the first data packet and perform one or more analysis processes to identify the manufactured article. If the scan is a scan of a QR code, the primary computing system can extract an identifier of the manufactured article from the QR code by analyzing the QR code using a QR code recognition algorithm. Similar techniques can be performed if the scan is of a bar code (e.g., an image of a bar code). If the scan is of a physical feature (e.g., a wear pattern on a component of the article), the data can be analyzed to determine whether the feature (e.g., pattern) is as expected or as previously determined to a sufficient degree (e.g., by generating a "biometric" signature that is compared with a prior "biometric" signature generated from a previous scan of the physical feature of the article, and if a similarity metric between the two exceeds a threshold, the identity of the article is deemed verified). The primary computing system may also execute one or more trained image recognition models to extract the "identifier" (e.g., whether the identifier is code-based and/or based on a "fingerprint" of the article or other "biometric" signature based on a sufficiently unique physical characteristic) of the manufactured article.

For example, the image recognition models may be utilized to recognize text in an image (e.g., optical character recognition (OCR), etc.). The text can be applied to one or more regular expression (regex) rules to identify the identifier of the manufactured article. In another embodiment, the computing device that performed the scan can extract the identifier using the aforementioned techniques, and can transmit the identifier to the primary computing system as part of the first data packet. Once the identifier of the manufactured article has been extracted, the primary computing system can utilize the identifier as a key value or a search value to identify a corresponding profile (e.g., an article profile 124) for the manufactured article. For example, the primary computing system can perform a search in a database (e.g., the database 122) of article profiles to identify the article profile associated with the extracted identifier.

At step 215, the method 200 includes transmitting, to the computing device, a first indication that the manufactured article has been identified. The indication can be, may include, or may be transmitted with a request for audiovisual data (based on, e.g., sensor data) corresponding to an operation of the manufactured article. The indication can include a message that indicates the identity of the manufactured article has been matched to a corresponding article profile. If the primary computing system fails to identify a corresponding article profile, the primary computing system can transmit an indication that identification failed and request additional scan data of the code corresponding to the manufactured article. The indication or request can be transmitted to the user device in the form of display instructions. The display instructions may include JavaScript, hypertext markup language 5 (HTML5) data, or other types of display instructions (e.g., instructions for a native application executing on the user device). The display instructions can cause the user device to present interactive user interface elements that indicate the manufactured article has been identified, and to request that the user capture audiovisual data of the manufactured article.

As used herein, audiovisual may encompass, in various embodiments, physical attributes that are detectable using sensors, including signals along the electromagnetic spectrum, such as visual imagery, thermal imagery (e.g., heat signature), radio frequency interference (RFI), electromagnetic interference (EMI), vibration, motion, etc., or any combination thereof. Sensors may be embedded within a manufactured device or other manufactured article, individually or as bundles of sensors. Other sensors may be external, such as closed-circuit television (CCTV), security camera, and/or other monitoring information. Certain audiovisual data may relate to network traffic via various protocols, and/or network logs.

The request may specify the type of operation of the manufactured article. For example, the primary computing system can request a particular type of operation for which there are signatures (e.g., the signatures 125) in the article profile of the manufactured article. In an embodiment, the operation includes a startup of the manufactured article, such that the audiovisual data would capture visuals and/or sound from the manufactured article during a startup process. Additionally or alternatively, the operation of the manufactured article can correspond to a task that is performed by or with the manufactured article (e.g., normal operations, specific tasks, etc.). In certain embodiments, the task may be performed by having the manufactured article interact with a specific "identification tool" that is manufactured to specifications so as to elicit a predictable response from the manufactured article. For example, if the manufactured article is, or includes, a sensor, the sensor may be used on the identification tool and the readings from the sensor evaluated to determine whether they are as expected when taking readings of the identification tool, and the readings can be used to identify, diagnose, or evaluate operation of the manufactured article. In the case of a sensor that detects light, the identification tool may be or may include, for example, a surface (or source of light) that has a predictable appearance in certain conditions; in the case of a sensor that detects sounds, the identification tool may be or may include, for example, an emitter of a certain sound signature to have the manufactured article obtain readings of the sounds emitted for comparison and evaluation. As another example, in the case of a manufactured article with a unique surface, the identification tool may be a light source that, when emitting light at the manufactured article, is expected to have a certain appearance (which can be captured with an imager and evaluated for identification or evaluation purposes). In another embodiment, any type of data can be captured from the manufactured article during any type of operation, and that data is not necessarily limited to audiovisual data. For example, vibrational data, electrical power consumption data, or other data that can be captured by the sensors of the computing device may be utilized in the techniques described herein. The display instructions can prompt the user to capture a particular type of sensor data (e.g., audiovisual data, power data, etc.) depending on the type of signatures present in the corresponding article profile of the manufactured article.

At step 220, the method 200 includes receiving, from the computing device, a second data packet including audiovisual data (based on, e.g., sensor data) corresponding to a recording by at least one of an imaging device or a microphone of the computing device. The second data packet can be any type of data structure that includes information relating to the scan. The second data packet can be a data packet that is transmitted via a network (e.g., the network 101). The audiovisual data can be captured using an imaging device, a microphone or sound recording device, or any other of the sensors of the computing device utilized by the user to capture data relating to the manufactured article. Additionally or alternatively, other sensor data can be captured using the sensors of the computing device, such as vibrational data of the manufactured article or power consumption data of the manufactured article. The sensor data captured by the computing device (or by another device that includes a sensor and that can provide sensor readings to the computing device by, e.g., a wireless or wired transmission) can be stored as part of the second data packet and transmitted to the primary computing system via a network. In an embodiment, the computing device may execute one or more analysis techniques over the audiovisual data (or other sensor data) to extract features that can be compared to one or more signatures stored in the article profile of the manufactured article.

At step 225, the method 200 includes extracting, from the second data packet, a sound sample corresponding to sounds made during the operation of the manufactured article. To do so, the primary computing system can extract one or more sound samples, or sensor data samples, from the second data packet transmitted by the computing device. The sound samples can be extracted by identifying a segment of the sound data (or other type of sensor data) that corresponds to the operation of the manufactured article. Analysis processes can be executed over the sound sample to extract one or more features that can be compared to a corresponding signature in the article profile for the manufactured article to verify the manufactured article. For example, the article profile can store one or more sound signatures (or other signatures corresponding to different types of sensor data).

The sound signature (and other signatures) can be generated using a previously captured sound sample (or other sample of sensor data) of sounds made by the manufactured article during a particular operation, such as startup or while performing a predetermined task. The signatures can include one or more different features, including time-domain features (e.g., mean, median, mode, standard deviation, variance, covariance, zero cross rate, minimum, maximum, root mean square, and duration, etc.) and frequency domain features (e.g., fast Fourier transform (FFT), wavelet transform, Z transform, etc.) of the sensor data (e.g., sound, video frames, power consumption data, vibrational features, etc.). Similar features can be extracted from the sensor data provided by the computing device in the second data packet. In an embodiment, the primary computing system may normalize or perform additional pre-processing operations over the sensor data prior to extracting the features described herein for comparison with the corresponding signature(s) of the manufactured article.

Additional information may also be utilized to verify the authenticity of the manufactured article. Certain manufactured articles may be large, or have known or pre-designated locations. Therefore, location data can be utilized to verify the identity of the manufactured article. To do so, the primary computing system may request, or may receive as part of or in addition to the second data packet, location data detected using a GPS device of the computing device (and/or a GPS device or other location and/or orientation sensors of the manufactured article, alone or in combination with sensor readings of the computing device or another device with a location and/or orientation sensor). In certain embodiments, location determinations may alternatively or additionally be based on the manufactured article's surroundings, proximity to certain objects, ambient conditions (e.g., indoors vs. outdoors, certain temperature range, wind conditions, etc.). The location data (and/or data on the article's ambient conditions or other physical characteristics related to the article or its environment) may be added to the identity profile of the manufactured article upon verification of the manufactured article using the techniques described herein, or may be utilized to verify the authenticity of the manufactured article in subsequent process steps.

At step 230, the method 200 includes generating a status metric based on a comparison of the sound sample to a sound signature in the article profile of the manufactured article. As described herein, the features extracted from the sound sample and the article profile can be compared to calculate a similarity score between the sound signature and the extracted features from the sound sample. The similarity score can be calculated, for example, by correlating the one or more features to calculate a degree of similarity between the captured sound sample (or other sensor data) and the corresponding signature. The similarity score (e.g., the degree of similarity) can be utilized to verify various characteristics of the manufactured article. Additionally, the degree of similarity may be utilized to monitor the operational performance of the manufactured article. The status metric can include the similarity score.

As described herein, the article profile can include various characteristics of the manufactured article. The article profile may sometimes be referred to as an "identity profile." The article profile can include a set of identity elements corresponding to the manufactured article, each of which can include information about an identifying characteristic of the manufactured article. The set of identity elements can include design data of the manufactured article, including but not limited to designed or specified dimensions of the manufactured article (e.g., a "blueprint" or information that may be found on a blueprint), weight, material, types of components included in the manufactured article, or types of tasks or functionality of the manufactured article, among others. The set of identity elements can include information relating to the manufacturing of the manufactured article, including but not limited to a place of manufacture, a time of manufacture, manufacturing tools or techniques used, etc.

At step 235, the method 200 includes transmitting, to the computing device, a status of the manufactured article based on the status metric. As described herein, the similarity score calculated by the primary computing system can indicate a degree of similarity between the captured sensor data and the sensor signature of the particular manufactured article. The primary computing system can generate a status that indicates that the manufactured article is in one or more states based on the value of the similarity score (e.g., the status metric). For example, the primary computing system can determine that the manufactured vehicle is in a first state if the status metric (e.g., the similarity score) exceeds a predetermined threshold. The first state can indicate that the manufactured article has been substantially unchanged (e.g., physically, operationally, etc.) since a time of generation of the sound signature (or other sensor signatures). For example, if the similarity score is above a similarity threshold, the sensor data captured is nearly identical to the signature of the manufactured article, indicating that the manufactured article is likely in good working condition and has not been tampered with. In an embodiment, the status can indicate that an identity of the manufactured article has been verified if the similarity score exceeds a predetermined threshold.

If the sound signature (or other sensor signature) substantially matches the captured sounds (or captured sensor data), the primary computing device may generate a second sound signature for the manufactured article to update the sound signature (or other type of signature) for the manufactured article. Alternatively, if one type of signature is substantially similar to the captured sensor data (e.g., sound), the primary computing system can generate a second signature for a different type of signature that is not yet present in the article profile (e.g., for vibrational sensors, power sensor data, etc.). The second signature can then be added to the article profile of the manufactured article for future verification or monitoring techniques. When multiple types of signatures are present in the article profile (e.g., each for a different type of sensor data), the primary computing system may calculate a similarity score for each signature by comparing the corresponding sensor data to the corresponding signature (e.g., based on type of sensor data). The similarity scores can be averaged to determine an overall similarity score, which can be used to determine the status as described herein. In an embodiment, the sound sample (or another type of sensor sample) can be added to the article profile of the manufactured article.

In contrast, if the primary computing system has determined that the similarity score is less than a predetermined threshold, the primary computing system can determine that the manufactured article is in a second state. The second state can indicate that the manufactured article could not be confirmed to be substantially unchanged since the time of generation of the sound signature. In such a case, the status of manufactured article can indicate that the identity of the manufactured article is unconfirmed. Additionally or alternatively, if the similarity score is below a second predetermined threshold (even lower than the first predetermined threshold), then the primary computing system can determine that the manufactured article is operating ineffectively, and may require maintenance. The predetermined computing system may also determine that the manufactured article has been tampered with or has been compromised if the similarity score is below the second predetermined threshold.

It is noted that method 200 may begin with (or include) a registration of the manufactured article based on certain original information (e.g., serial number, location, assigned name, etc.).

Figure 3:
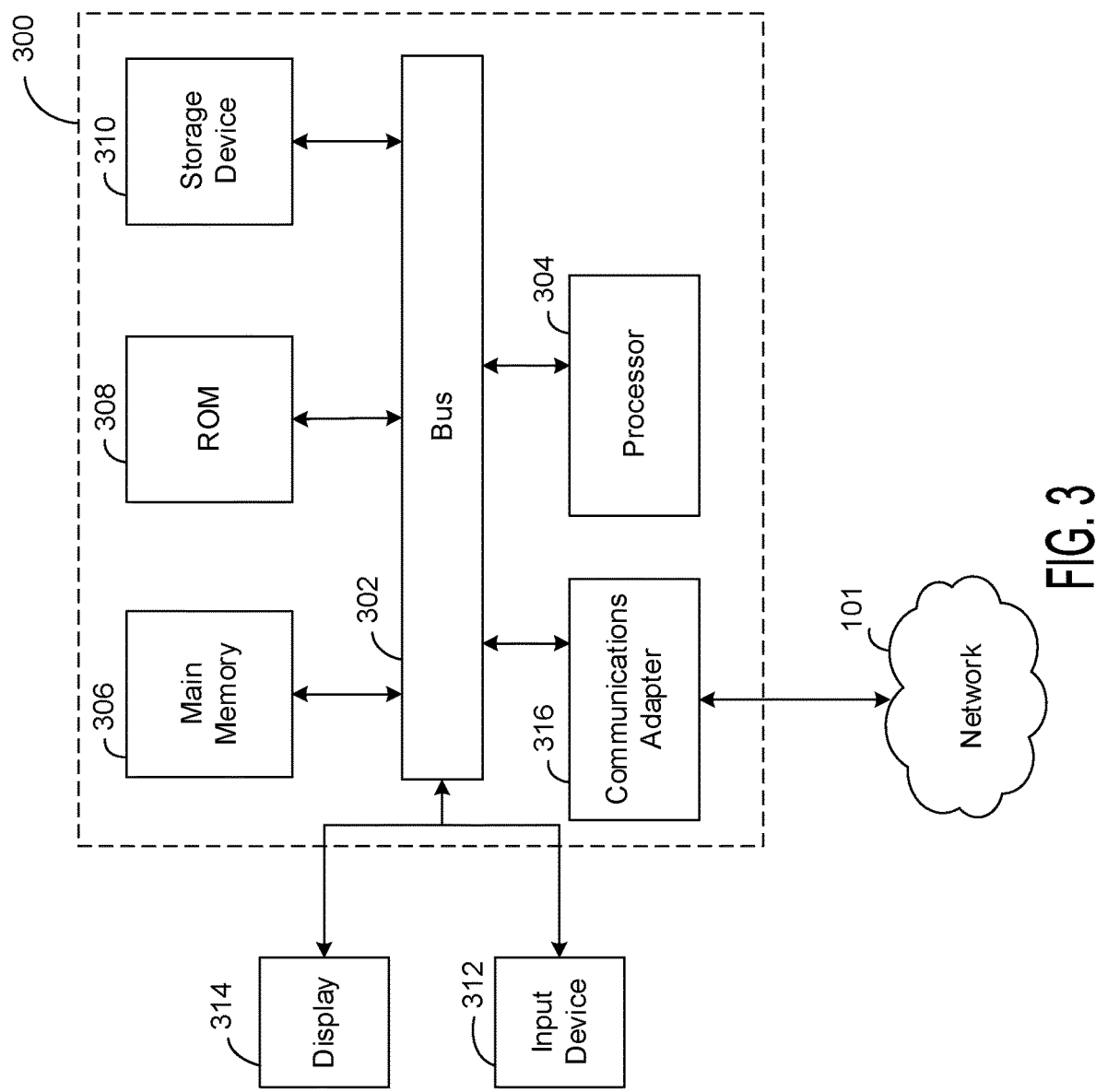
FIG. 3 is a component diagram of an example computing system suitable for use in the various arrangements described herein, in accordance with one or more example implementations.

FIG. 3 is a component diagram of an example computing system suitable for use in the various implementations described herein, according to an example implementation. For example, the computing system 300 may implement an example user device 103 or primary computing system 104 of FIG. 1, or various other example systems and devices described in the present disclosure.

The computing system 300 includes a bus 302 or other communication component for communicating information and a processor 304 coupled to the bus 302 for processing information. The computing system 300 also includes main memory 306, such as a RAM or other dynamic storage device, coupled to the bus 302 for storing information and instructions to be executed by the processor 304. Main memory 306 can also be used for storing position information, temporary variables, or other intermediate information during execution of instructions by the processor 304. The computing system 300 may further include a read only memory (ROM) 308 or other static storage device coupled to the bus 302 for storing static information and instructions for the processor 304. A storage device 310, such as a solid-state device, magnetic disk, or optical disk, is coupled to the bus 302 for persistently storing information and instructions.

The computing system 300 may be coupled via the bus 302 to a display 314, such as a liquid crystal display, or active matrix display, for displaying information to a user. An input device 312, such as a keyboard including alphanumeric and other keys, may be coupled to the bus 302 for communicating information, and command selections to the processor 304. In another implementation, the input device 312 has a touch screen display. The input device 312 can include any type of biometric sensor, or a cursor control, such as a mouse, a trackball, or cursor direction keys, for communicating direction information and command selections to the processor 304 and for controlling cursor movement on the display 314.

In some implementations, the computing system 300 may include a communications adapter 316, such as a networking adapter. Communications adapter 316 may be coupled to bus 302 and may be configured to enable communications with a computing or communications network 101 and/or other computing systems. In various illustrative implementations, any type of networking configuration may be achieved using communications adapter 316, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 300 in response to the processor 304 executing an implementation of instructions contained in main memory 306. Such instructions can be read into main memory 306 from another computer-readable medium, such as the storage device 310. Execution of the implementation of instructions contained in main memory 306 causes the computing system 300 to perform the illustrative processes described herein. One or more processors in a multi-processing implementation may also be employed to execute the instructions contained in main memory 306. In alternative implementations, hard-wired circuitry may be used in place of or in combination with software instructions to implement illustrative implementations. Thus, implementations are not limited to any specific combination of hardware circuitry and software.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more general-purpose processors, ASICs, FPGAs, digital signal processors (DSPs), or other suitable electronic data processing components structured to execute instructions provided by memory. The one or more processors may take the form of a single core processor, multi-core processor (e.g., a dual core processor, triple core processor, and/or quad core processor), microprocessor, etc. In some implementations, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data, which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

What is claimed is:

1. A method for maintaining identity elements for manufactured articles, the method comprising:
receiving, from a computing device, a first data packet comprising scan data corresponding to a scan by an imaging device of the computing device;
analyzing the scan data in the first data packet to determine that the scan data corresponds to a manufactured article;
transmitting, to the computing device, a first indication that the manufactured article has been identified and a request for audiovisual data and motion data corresponding to an operation of the manufactured article;
receiving, from the computing device, a second data packet comprising audiovisual data corresponding to a recording by at least one of the imaging device or a microphone of the computing device;
extracting, from the second data packet, a sound sample corresponding to sounds made during the operation of the manufactured article;
receiving, from the computing device, a third data packet comprising the motion data of the manufactured article captured by a vibration sensor in proximity to the manufactured article, the motion data indicating vibrations created by the manufactured article during operation of the manufactured article;
generating frequency-domain sound data and frequency-domain motion data based on the sound sample, the motion data, and a frequency-domain transformation operation;
generating a status metric based on (i) a comparison of the frequency-domain sound data to a sound signature in an identity profile of the manufactured article, and (ii) a comparison of the frequency-domain motion data to a vibration signature in the identity profile of the manufactured article; and
transmitting, to the computing device, a status of the manufactured article based on the status metric.

2. The method of claim 1, wherein the status indicates that the manufactured article is in a first state if the status metric exceeds a threshold, or a second state otherwise.

3. The method of claim 2, wherein the first state indicates that the manufactured article is substantially unchanged since a time of generation of the sound signature, and the second state indicates that the manufactured article could not be confirmed to be substantially unchanged since the time of generation of the sound signature.

4. The method of claim 1, wherein the status indicates that an identity of the manufactured article has been verified.

5. The method of claim 1, wherein the scan corresponds to a code corresponding to the manufactured article.

6. The method of claim 5, wherein the code is a QR code affixed to the manufactured article.

7. The method of claim 1, wherein the imaging device is a camera of the computing device, and wherein the scan corresponds to an image of the manufactured article captured using the camera.

8. The method of claim 1, wherein the recording is a video of the manufactured article.

9. The method of claim 1, further comprising adding the sound sample or the frequency-domain sound data to the identity profile of the manufactured article.

10. The method of claim 1, further comprising generating a second sound signature for the manufactured article, and adding the second sound signature to the identity profile of the manufactured article.

11. The method of claim 1, further comprising generating the sound signature based on an earlier sound sample of sounds made by the manufactured article during operation.

12. The method of claim 1, further comprising receiving, from the computing device, location data detected using a GPS device of the computing device, and adding the location data to the identity profile of the manufactured article.

13. The method of claim 1, wherein the operation comprises a startup of the manufactured article.

14. The method of claim 1, wherein the operation corresponds to the manufactured article performing a task, and wherein the sound signature is based on sounds made by the manufactured article previously performing the task.

15. The method of claim 1, wherein the identity profile comprises a set of identity elements corresponding to the manufactured article.

16. The method of claim 15, wherein the set of identity elements comprises data on a design of the manufactured article.

17. The method of claim 15, wherein the set of identity elements comprises data on manufacturing of the manufactured article.

18. A computing system comprising one or more processors configured to:
receive, from a computing device, a first data packet comprising scan data corresponding to a scan by an imaging device of the computing device;
analyze the scan data in the first data packet to determine that the scan data corresponds to a manufactured article;
transmit to the computing device a first indication that the manufactured article has been identified and a request for audiovisual data and motion data corresponding to an operation of the manufactured article;
receive, from the computing device, a second data packet comprising audiovisual data corresponding to a recording by at least one of the imaging device or a microphone of the computing device;
extract, from the second data packet, a sound sample corresponding to sounds made during the operation of the manufactured article;
receive, from the computing device, a third data packet comprising the motion data of the manufactured article captured by a vibration sensor in proximity to the manufactured article, the motion data indicating vibrations created by the manufactured article during operation of the manufactured article;
generate frequency-domain sound data and frequency-domain motion data based on the sound sample, the motion data, and a frequency-domain transformation operation;
generate a status metric based on (i) a comparison of the frequency-domain sound data to a sound signature in an identity profile of the manufactured article, and (ii) a comparison of the frequency-domain motion data to a vibration signature in the identity profile of the manufactured article; and
transmit, to the computing device, a status of the manufactured article based on the status metric.

19. The computing system of claim 18, wherein the status indicates that the manufactured article is in a first state if the status metric exceeds a threshold, or a second state otherwise.

20. The computing system of claim 19, wherein the first state indicates that the manufactured article is substantially unchanged since a time of generation of the sound signature, and the second state indicates that the manufactured article could not be confirmed to be substantially unchanged since the time of generation of the sound signature.

\* \* \* \* \*